United States Patent
Lewis, Jr. et al.

(10) Patent No.: US 11,781,194 B2
(45) Date of Patent: Oct. 10, 2023

(54) HBI SLOW COOLING SYSTEM AND METHOD

(71) Applicant: Midrex Technologies, Inc., Charlotte, NC (US)

(72) Inventors: James Lloyd Lewis, Jr., Charlotte, NC (US); Brian Voelker, Concord, NC (US); Lemuel Orleans, Talisay (PH)

(73) Assignee: Midrex Techonologies, Inc., Charlotte, NC (US)

( * ) Notice: Subject to any disclaimer, the term of this patent is extended or adjusted under 35 U.S.C. 154(b) by 62 days.

(21) Appl. No.: 17/500,427

(22) Filed: Oct. 13, 2021

(65) Prior Publication Data

US 2022/0119900 A1 Apr. 21, 2022

Related U.S. Application Data

(60) Provisional application No. 63/092,015, filed on Oct. 15, 2020.

(51) Int. Cl.
*C21B 13/00* (2006.01)
*B65G 15/08* (2006.01)
*B65G 17/06* (2006.01)
*B65G 23/02* (2006.01)

(52) U.S. Cl.
CPC .......... *C21B 13/0086* (2013.01); *B65G 15/08* (2013.01); *B65G 17/067* (2013.01); *B65G 23/02* (2013.01)

(58) Field of Classification Search
CPC .. C21B 13/0086; B65G 15/08; B65G 17/067; B65G 23/02
See application file for complete search history.

(56) References Cited

U.S. PATENT DOCUMENTS

| | | | | |
|---|---|---|---|---|
| 2,096,948 A | * | 10/1937 | Waalkes | B65G 17/067 198/710 |
| 2,121,298 A | * | 6/1938 | Komarek | B65G 17/30 198/820 |
| 2,936,063 A | * | 5/1960 | Thomas | B65G 17/067 198/500 |
| 3,953,928 A | * | 5/1976 | Novy | F27D 15/0266 201/3 |

(Continued)

FOREIGN PATENT DOCUMENTS

| | | |
|---|---|---|
| DE | 335987 C | 4/1921 |
| WO | 202022623 A1 | 11/2020 |

OTHER PUBLICATIONS

Jan. 28, 2022 International Search Report issued in corresponding International Application No. PCT/US21/54940.

*Primary Examiner* — Mark A Deuble
(74) *Attorney, Agent, or Firm* — Clements Bernard Walker; Christopher L. Bernard; Christine Wilkes Beninati

(57) ABSTRACT

A briquette cooling conveyor system includes an apron pan conveyor. The apron pan conveyor includes: an apron pan with openings adapted to drain water from the apron pan conveyor, an apron pan upper, carry strand, and an apron pan lower, return strand. The briquette cooling conveyor system further includes a carriage side flushing hopper positioned between the apron pan upper, carry strand and the apron pan lower, return strand, and the carriage side flushing hopper is configured to capture fines and water from the system.

20 Claims, 9 Drawing Sheets

(56) References Cited

U.S. PATENT DOCUMENTS

| | | | |
|---|---|---|---|
| 3,969,192 A * | 7/1976 | Struck | C10B 39/04 |
| | | | 134/131 |
| 4,701,243 A * | 10/1987 | Lorenz | C10B 39/00 |
| | | | 201/3 |
| 4,840,269 A * | 6/1989 | Anderson | B65G 17/067 |
| | | | 198/851 |
| 5,666,638 A * | 9/1997 | Bergendahl | B30B 11/16 |
| | | | 75/751 |
| 5,930,579 A | 7/1999 | Nagumo et al. | |
| 6,214,086 B1 | 4/2001 | Montague et al. | |
| 6,340,378 B1 | 1/2002 | Hinrichsen | |
| 6,652,620 B2 | 11/2003 | Miyagawa | |
| 7,228,960 B2 | 6/2007 | Müller | |
| 7,678,176 B2 | 3/2010 | Whitten et al. | |
| 8,088,194 B2 | 1/2012 | Tsutsumi | |
| 9,540,175 B1 * | 1/2017 | Van Dalsem | B65G 17/10 |
| 11,618,035 B2 * | 4/2023 | Fitzmaurice | B65G 17/067 |
| | | | 241/62 |
| 2019/0161279 A1 | 5/2019 | Bojinescu | |

* cited by examiner

HBI SLOW COOLING SYSTEM AND METHOD

CROSS-REFERENCE TO RELATED APPLICATION

The subject U.S. Non-provisional Patent Application claims priority to U.S. Provisional Patent Application No. 63/092,015 filed on Oct. 15, 2020, the contents of which are herein incorporated by reference.

TECHNICAL FIELD

The present disclosure relates generally to the direct reduced iron (DRI) and iron-making fields. More specifically, the present disclosure relates to systems and methods for slow cooling of briquettes.

BACKGROUND

Hot Direct Reduced iron (HDRI) is distributed from a DRI furnace to briquetting machines to form Hot Briquetted Iron (HBI), a densified form of DRI whose quality is improved through cooling the material from briquetting temperatures of about 650-700° C. to 400° C. in approximately 2 minutes, and no less than about 1.5 minutes. HBI is a densified form of DRI that is more easily handled, shipped, and stored.

HBI quality is measured against cooling rates downstream of the briquetting operations. Briquettes slowly cooled to about 400° C. generally are superior quality briquettes as these briquettes typically exhibit greater strength and lower breakage based on drop tests. The particular drop test often employed includes individually dropping five single-briquette samples of HBI from a 5-meter or 10-meter height then collecting the fragments and measuring the size distribution in mass fractions. The historic standard is the 10-meter drop test, although more recently the 5-meter drop test is used for expediency. The key size fraction for quality measurement is the +38 mm size fraction rate. By employing slow cooling, the +38 mm size fraction rate can be increased from a range of 55%-65% up to a range of 80%-85%. This quality parameter means that there is a greater quantity of briquettes that remain whole during handling, storage, and shipping, which provides the end user, such as a melting furnace operator, with a consistent product stream of mostly whole briquettes and/or large fragments. Smaller fines and fragments are often considered deleterious for several reasons, which include but are not limited to, higher metal loss through greater re-oxidation; increased handling difficulty; increased losses due to carryover in off-gas; increased segregation of fractions leading to bridging/plugging; and increased melting difficulty.

In recent years, HBI quality guarantees have relied upon the tumble test, which is often employed in concert with or in place of the drop test. The tumble test is governed and defined by an International Organization for Standardization (ISO) test procedure (ISO procedure no. 15967-2007), while the drop test is not governed or defined by an ISO test procedure. The tumble test involves charging a quantity of briquettes to a rotating drum which tumbles the material for hundreds of revolutions. The mass of material is then discharged and screened to measure mass fractions against screen sizes. The typical quality target is 95% of the material having a measurement greater than 6.35 mm (95%+6.35 mm). While the tumble test results may be of some less significance to the end user in terms of defining the quality of the HBI briquettes, advantages of the tumble test include its ease to replicate and that it is a formally recognized standard, and may be used in combination with the drop test.

It is noted that the drop test was the original metric used to establish the quality of the slow cooling process at several HBI plants operated by Kobe Steel. The slow cooling process (i.e., cooling the material from briquetting temperatures of about 650-700° C. to 400° C. in approximately 2 minutes, and no less than about 1.5 minutes) is well-proven with many millions of tons of HBI product shipped since its implementation in the early 1990s.

The apparatus used to implement the slow cooling process has varied over the ensuing decades. However, each apparatus can suffer from various combinations of high frequencies of mechanical maintenance, high mechanical wear and/or breakage of various parts of the apparatus, disruption of cooling due to fines accumulation within the apparatus, inadequate cooling performance of the briquettes by the apparatus, inadequate vapor removal from the apparatus, and inadequate fines/water separation by the apparatus, among others. The HBI slow cooling process presents an extreme combination of factors that cause difficulties in designing and implementing a cost-effective and reliable mechanical apparatus.

Accordingly, there remains the need to provide an improved apparatus and method for achieving the desired slow cooling process. Embodiments of the invention address these needs and others.

SUMMARY

Methods deployed for slow cooling briquettes to produce HBI product typically use water as the primary cooling medium. The water dispersion is regulated and controlled in order to achieve the slow cooling regime (cooling of the material from briquetting temperatures of about 650-700° C. to 400° C. in approximately 2 minutes, and no less than 1.5 minutes). The water dispersion is typically performed using one of a weir-type overflow device that causes water to cascade over the briquettes and pressurized nozzles that spray water onto the briquettes. However, with use of such weir-type overflow devices and pressurized nozzles, a problem is that the components of the apron pan conveyors are often damaged in varying degrees from water immersion and constant water spray exposure. The damage includes damage to rollers and chains of the apron pan conveyors due to the failure of water damaged seals, corrosion of links causing the weakening thereof, build-up of fines, and galling caused by water-borne fines.

The briquettes are transported using one of mesh belts, apron pan conveyors, and vibratory conveyors. The apron pan conveyor is an especially advantageous mode of transport for the briquettes. However, apron pan conveyors used in this application have high levels of mechanical failures, which include support roller failure, carriage rail failure, pan wear, and drive chain failure. In some instances, the deployment of vibratory units on the apron pan conveyor result in failures, e.g., requiring complete replacement or limited use of another apron pan conveyor. Further, the mesh belts used in apron pan conveyors require replacement on a regular basis, such as an annual or bi-annual basis.

Additionally, fines collection and removal are problematic and difficult, resulting in significant issues in apron pan conveyors. For example, in prior versions, apron pan conveyors used a fully immersed drag chain, which proved functional, but was susceptible to high wear and breakage. The high wear and breakage led to repeated repairs and replacements. Later versions of apron pan conveyor systems also experienced issues such as plugging with fines and inadequate removal of fines, each requiring significant maintenance steps to clear the fines from the system and keep the systems clean and functional. Along with the significant maintenance issues, in some instances additional systems, such as a vacuum system is installed for the sole purpose of cleaning out sumps on regular basis. These systems require additional capital investment and may require scheduled shutdowns of the system for the use thereof.

With an increase in HBI volumetric output at plants, slow cooling system sizes have also increased. The increase in sizes of the slow cooling systems increases potential for material mal-distribution on the conveyors, which may impact briquette cooling and mechanical performance of the conveyors. For example, increasing the size of the slow cooling system results in an increase in the number of charging points per cooling conveyor. The increase in charging points per conveyor may cause issues with proper distribution of briquettes on the conveyor and proper leveling of the briquettes on the conveyor. Further, the increase in charging points can result in increased wear of the pan, which indicates a need for improved charging.

Vapor removal and extraction is also difficult and can require a significant capital investment for improvement thereof using current methodologies. Furthermore, handling metal and oxide fines entrained in a saturated vapor is inherently problematic due to fines saltation accreting to bridge and plug ductwork. Further, cooling HBI off-gases a small amount of carbon monoxide (CO), which should also be managed. Finally, emissions controls should also be managed and improved to meet increasingly stringent regulatory levels, both in terms of particulate and gaseous emissions.

In view of the foregoing and as noted above, there remains the need to provide an improved apparatus and method for achieving the desired slow cooling process. Embodiments of the invention address these needs and others.

For instance, according to embodiments, the HBI slow cooling systems and methods of the present disclosure comprise an advantageous redesign to achieve the desired process parameters, while mitigating negative impacts realized over a roughly thirty-year span of operating installations. In particular, the herein HBI slow cooling systems and methods address the severe service needs with components adapted specifically to overcome known failure modes.

More particularly, according to embodiments, the HBI slow cooling systems and methods of the present disclosure are advantageously adapted to avoid the exposure of the components to constant water sprays, while ensuring that the components are not immersed in water.

According to an aspect of the invention, a briquette cooling conveyor system comprises an apron pan conveyor. The apron pan conveyor includes: a) an apron pan or a plurality of apron pans, including openings adapted to drain water from the apron pan conveyor; b) an apron pan upper, carry strand; and c) an apron pan lower, return strand. The conveyor system also comprises a carriage side flushing hopper positioned between the apron pan upper, carry strand and the apron pan lower, return strand. The carriage side flushing hopper is configured to capture fines and water from the system. Also, the system may be configured to slow cool hot briquettes from briquetting temperatures of about 650-700° C. to 400° C. in approximately 2 minutes, and no less than about 1.5 minutes. The system may comprise a return side flushing hopper position under the return strand, and wherein the carriage side flushing hopper includes: wash-down sprays adapted to wet sides of the carriage side flushing hopper, and a channel flow nozzle configured to produce a channel flow of water to flush solids to a desired output, wherein the flow is between about 50 gal/min to about 150 gal/min. The carriage side flushing hopper may include at least one screw classifier, and each screw classifier comprises a water overflow launder. The carriage side flushing hopper may comprise a hopper bottom that is one of arcuate, vee-shaped and trapezoidal. The conveyor system may comprise a cooling system, wherein the cooling system includes a plurality coarse spray nozzles configured to spray water onto briquettes in coarse water droplet size of about 0.8 to about 2 mm in diameter. The carriage side flushing hopper and the return side flushing hopper may be configured to discharge flow to a closely coupled classifier and the classifier is configured to discharge water to a pump sump. The system may be configured to recirculate water to the wash-down sprays and to water treatment. The conveyor may be inclined on a single level and the system comprises a hot briquette iron charge chute coupled to the conveyor, and a load leveling device on the conveyor configured to evenly spread the iron, the load leveling device including a spiral screw. The return strand may be fitted with cleaning spray nozzles to wash any residual material on the apron pan into the return side flushing hopper.

According to another aspect of the invention, a method of cooling hot briquetted iron comprises: providing a briquette cooling conveyor system. The system comprises: an apron pan conveyor. The apron pan conveyor includes: a) an apron pan or a plurality of apron pans, including openings to drain water from the apron pan conveyor; and b) an apron pan upper, carry strand; and c) an apron pan lower, return strand. The system also comprises a carriage side flushing hopper positioned between the apron pan upper, carry strand and the apron pan lower, return strand, the carriage side flushing hopper capturing fines and water from the system. The method further comprises cooling the hot briquetted iron as the iron travels along the apron pan conveyor from briquetting temperatures of about 650-700° C. to 400° C. in approximately 2 minutes, and no less than about 1.5 minutes, wherein discharge temperature is about greater than 85° C. and less than about 130° C. The conveyor system may comprise a return side flushing hopper position under the return strand, and wherein the carriage side flushing hopper includes: wash-down sprays to wet sides of the carriage side flushing hopper, and a channel flow nozzle to produce a channel flow of water to flush solids to a desired output, and the flow is between about 50 gal/min to about 150 gal/min. The carriage side flushing hopper may include at least one screw classifier, and each screw classifier comprises a water overflow launder. The carriage side flushing hopper may comprise a hopper bottom that is one of arcuate, vee-shaped and trapezoidal. The system may comprise a cooling system including a plurality coarse spray nozzles to spray water onto briquettes in coarse water droplet size of about 0.8 to about 2 mm in diameter. The carriage side flushing hopper and the return side flushing hopper may discharge flow to a closely coupled classifier and the classifier discharges water to a pump sump. The system may recirculate water to the wash-down sprays and to water treatment. The conveyor may be inclined on a single level and the system comprises a hot briquette iron charge chute coupled to the conveyor, and a load leveling device on the conveyor configured to evenly spread the iron, the load leveling device including a spiral screw. The return strand may be fitted with cleaning spray nozzles to wash any residual material on the apron pan into the return side flushing hopper. After cooling, the discharged iron may have a retained moisture level of less than about 1.5% by weight.

Also according to embodiments and as further described below, the apron pan may be the same as described above, and the flushing flow can be higher than about 150 gal/min and with no classifier in the carriage side flushing hopper. The higher flushing flow may sluice all the slurry down to a closely-coupled classifier that separates solids to a fines conveyor and water overflows to a sump for pumping as described above. Distinctions from the former aspect may include a) no classifiers in hopper, and b) higher flows to flow all slurry to the single classifier at the end.

BRIEF DESCRIPTION OF THE DRAWINGS

The present disclosure is illustrated and described with reference to various drawings, in which.

DETAILED DESCRIPTION

Again, the HBI slow cooling systems and methods of the present disclosure comprise an advantageous redesign to achieve the desired process parameters, while mitigating negative impacts realized over a roughly thirty-year span of operations. In particular, the herein HBI slow cooling systems and methods address the severe service needs with components adapted specifically to overcome known failure modes. Advantageously, the HBI slow cooling systems and methods of the present disclosure are adapted to limit the exposure of the components to constant water sprays, while ensuring that the components are not immersed in water.

As further explained below and according to embodiments, in systems and methods of the present disclosure the carriage side flushing hopper (or sluice) 3 is advantageously sandwiched between the carry and return strands 26, 28 so that the fines and water from the cooling process are captured in the carriage side flushing hopper (sluice) 3 without impinging the return strand 28, and avoiding the issues encountered with flushing slurry to an external trench where channel velocity is difficult to maintain and solids settle out as a matter of course, causing significant maintenance problems.

Advantageously, capturing and conveying water and fines in a flushing hopper (sluice) rather than, e.g., a tank maintains wheels and chains non-immersed thereby avoiding problems encountered in prior designs.

Thus, advantages of embodiments include improved handling of fines, e.g., avoiding fines in trenches, reducing water out-flow to a single sump and pump, and reducing mechanical complexity by avoiding long drag chains or screw conveyors, while also minimizing the potential for plugged weirs and nozzles.

Further advantages of embodiments include sizing the apron pan 20 to a desired length allowing for, e.g., four charging points or possibly more, and replacing overflow weirs with coarse spray nozzles 46 such as scrubber nozzles to provide coarse droplet sizes, as further described below.

Figure 1:
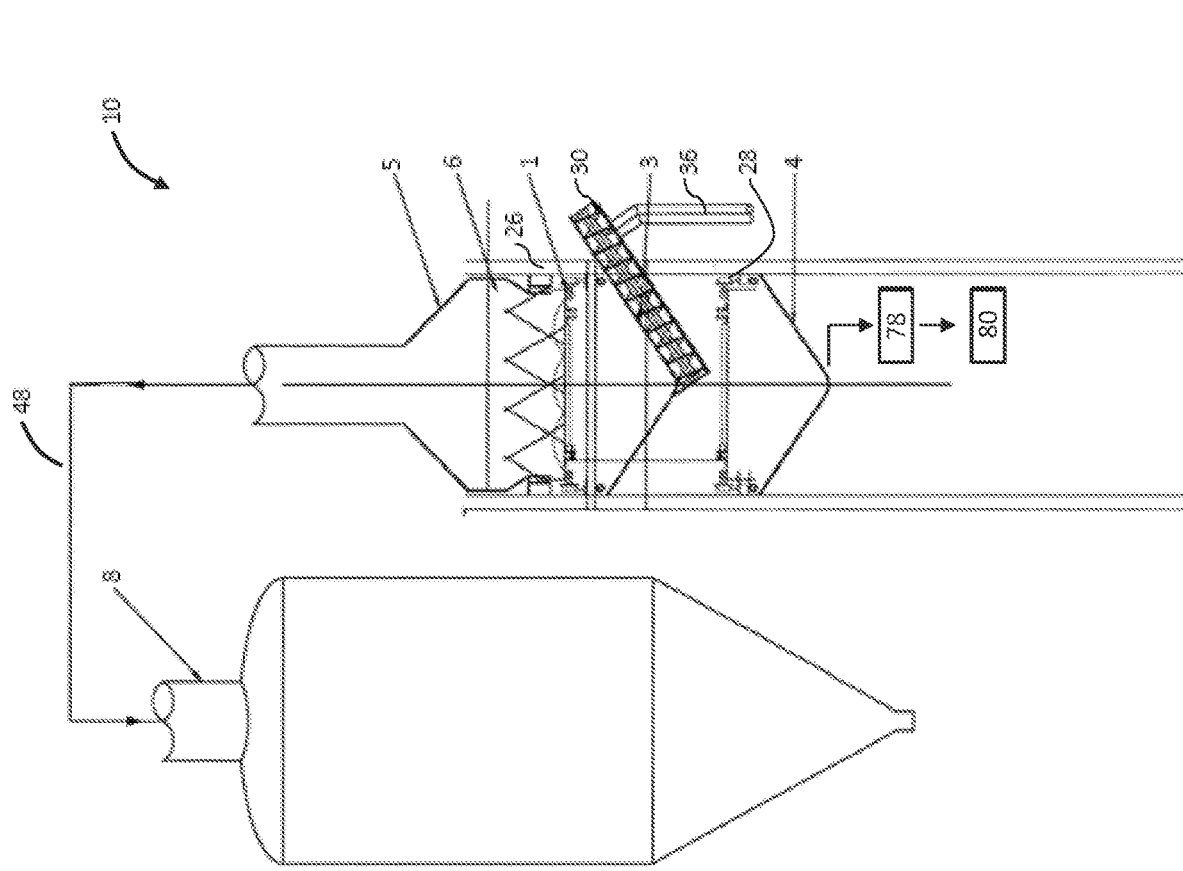
FIG. 1 is a schematic cross-sectional diagram illustrating an example embodiment of an HBI slow cooling system of the present disclosure.
Figure 2:
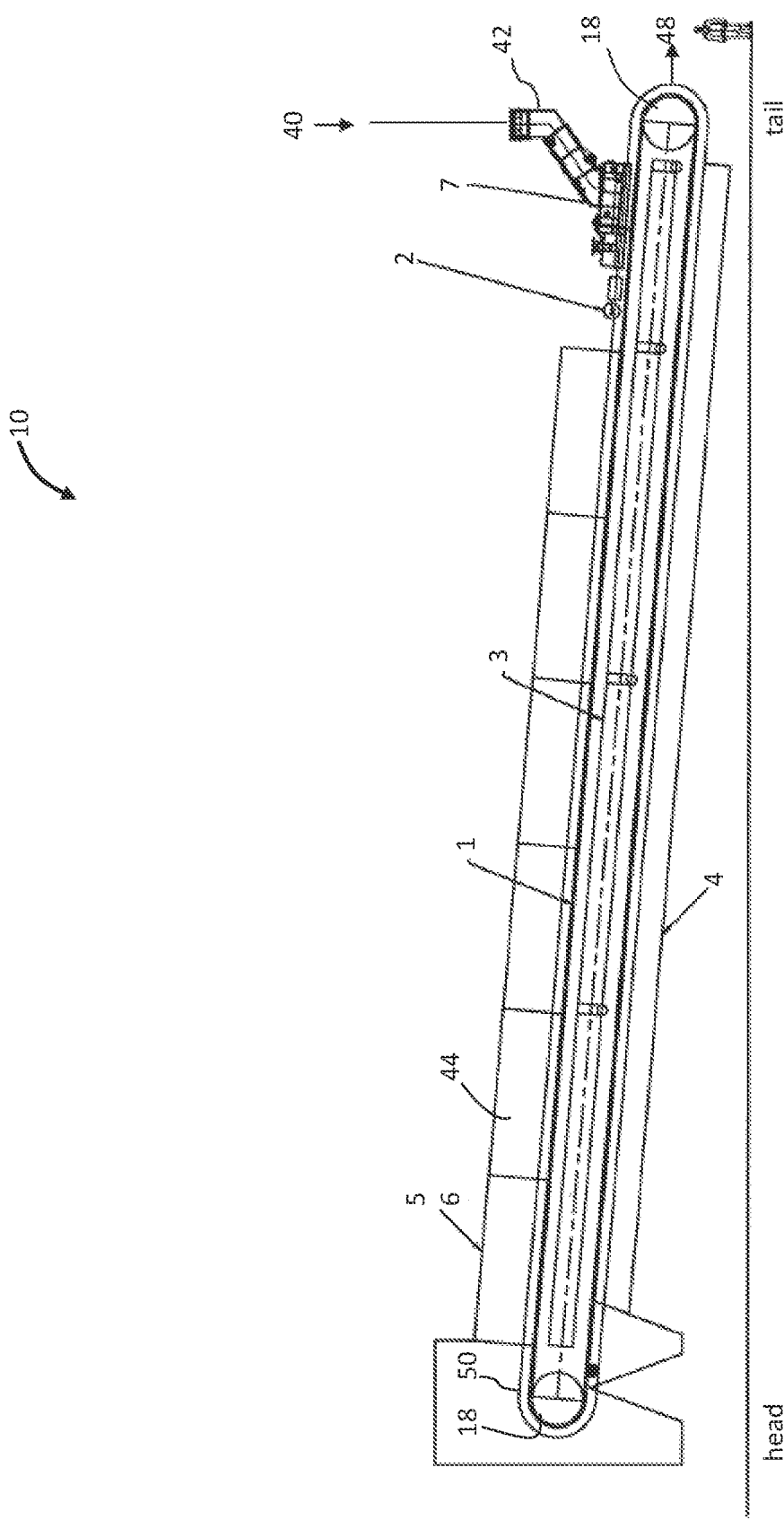
FIG. 2 is a schematic diagram illustrating a side of the HBI slow cooling system of FIG. 1.

Referring now to FIGS. 1 and 2, FIG. 1 a schematic cross-sectional diagram illustrating an example embodiment of an HBI slow cooling system or briquette cooling conveyor system 10 of the present disclosure, and FIG. 2 is a schematic diagram illustrating a side view of the system 10 of FIG. 1. According to embodiments, the HBI slow cooling system or briquette cooling system 10 includes an apron pan conveyor 1, an optional load levelling device 2, a carriage side flushing hopper (flushing hopper may also herein be referred to as a "sluice") 3, a vapor removal hood 5, a vapor scrubber system 8, a return side residual flushing hopper (flushing hopper may also herein be referred to as a "sluice" as noted above) 4, a charging chute assembly 7, and a cooling system 6. Each of these elements are described in further detail below, according to embodiments.

The apron pan conveyor 1 may include chains, rollers, an apron pan, a tension-balancing take-up system, carrying rails, carry and return conveyor strands, and a drive system. The conveyor 1 is advantageously designed on a single incline, typically 3 degrees with a 19 degree maximum incline from horizontal, which promotes fines/water flushing or sluicing and works especially well with HBI and round pellets. Conveyor 1 speed is typically about 0.05 to 0.3 m/s such as 0.2 m/s, and may be even faster, and is designed to provide flexible control. It will be appreciated that other suitable speeds may be employed. Advantageously, the speed may be varied to, e.g., match desired through put and cooling. The apron pan conveyor 1 is typically designed to dewater before discharging.

Figure 7:
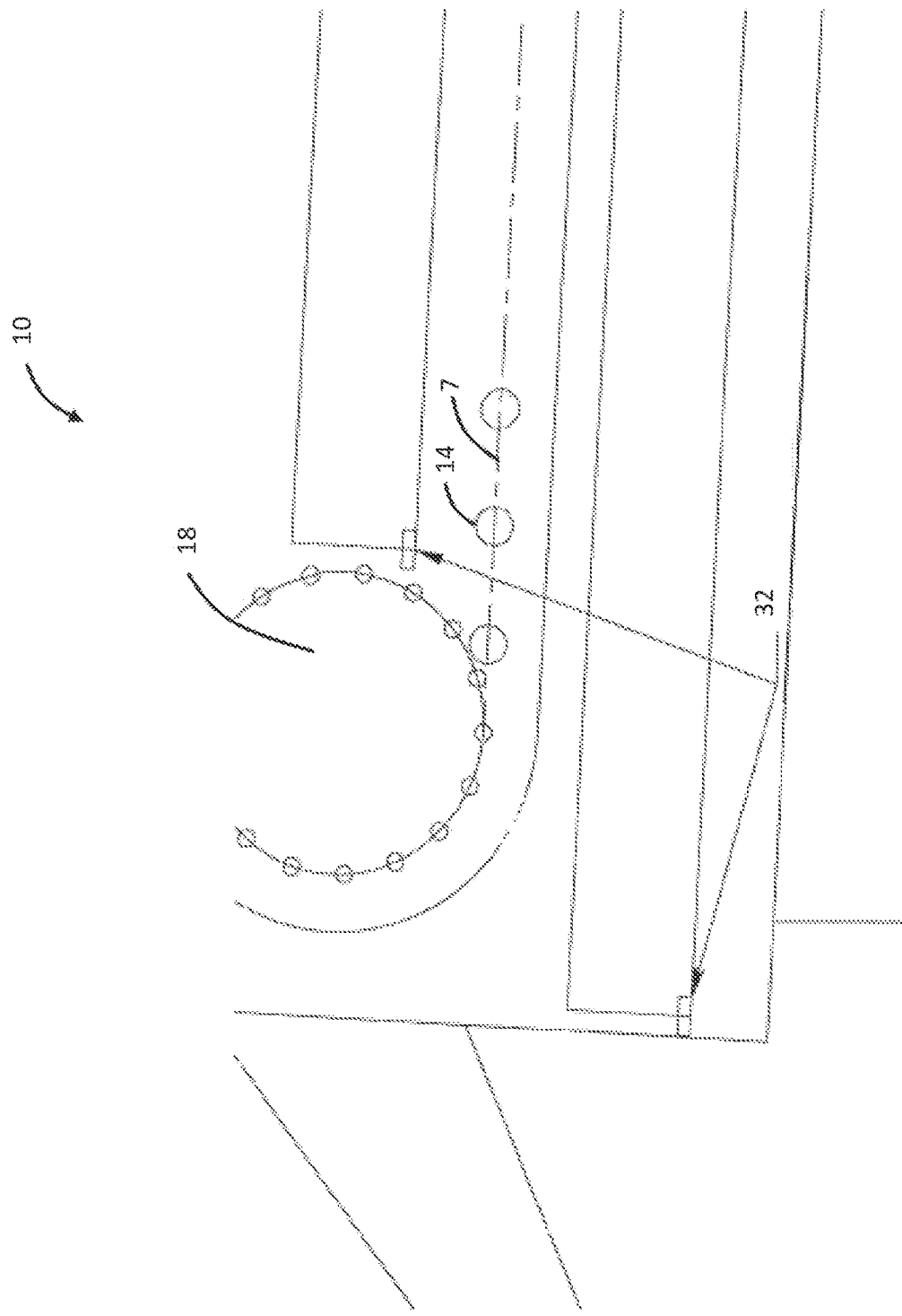
FIG. 7 is a schematic diagram illustrating a partial side view of an example embodiment of the HBI slow cooling system of the present disclosure, particularly illustrating channel flow nozzles.

The chains 12, best seen in FIG. 7, are adapted to resist the heat, corrosion, abrasion, and any wetness encountered in HBI slow cooling system 10 including a 100° C. to 700° C. temperature range, carbonic acid potential, iron and oxide fines, and water sprays.

Figure 6:
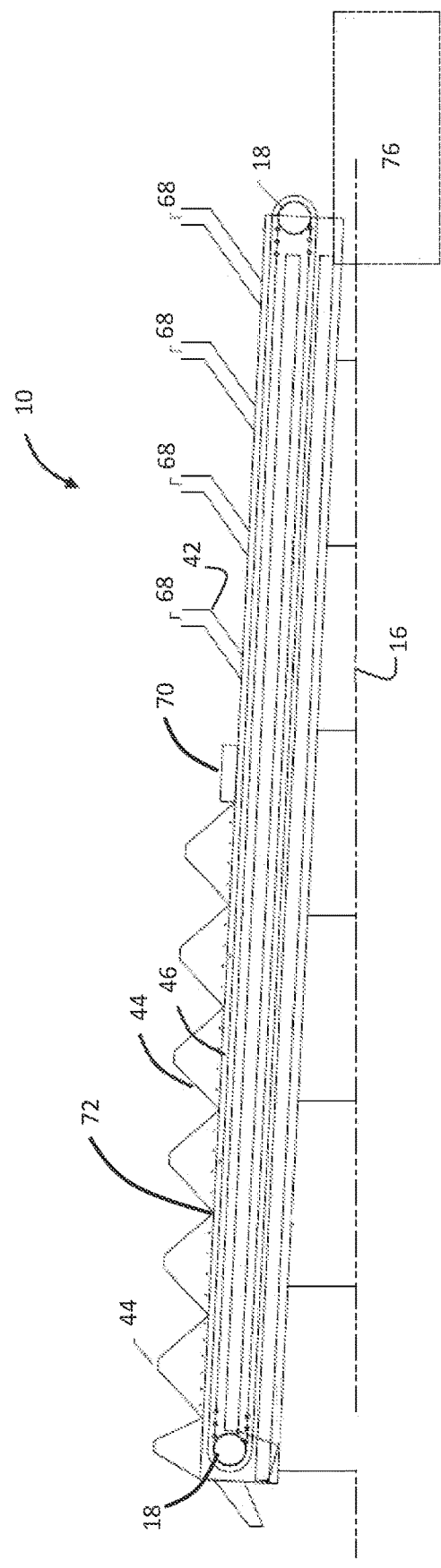
FIG. 6 is a schematic diagram illustrating a side view of FIG. 5.

Rollers 14, also best seen in FIG. 7, are adapted to remain sealed and lubricated under the same conditions as the chains 12, described above. The rollers 14 are positioned outboard of a water impingement area. Advantageously, these apron pan rollers 14 or wheels are non-immersed in water, according to embodiments. For instance, as shown in FIG. 6, the rollers 14 are positioned well above water line 16. In a preferred embodiment, the rollers 14 may be attached to the chain at every other link to support the apron pans, attached at every link. Alternately, the HBI slow cooling system 10 may include rollers 14 combined with the chains 12, which combination is adapted to reduce wear on drive sprockets 18.

Figure 9:
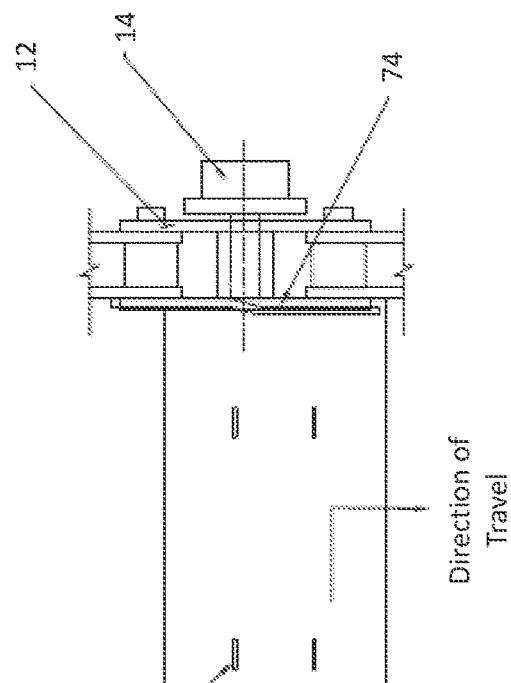
FIG. 9 is a schematic diagram illustrating an example embodiment of a portion of an apron pan particularly illustrating elongated slots therein.
Figure 8:
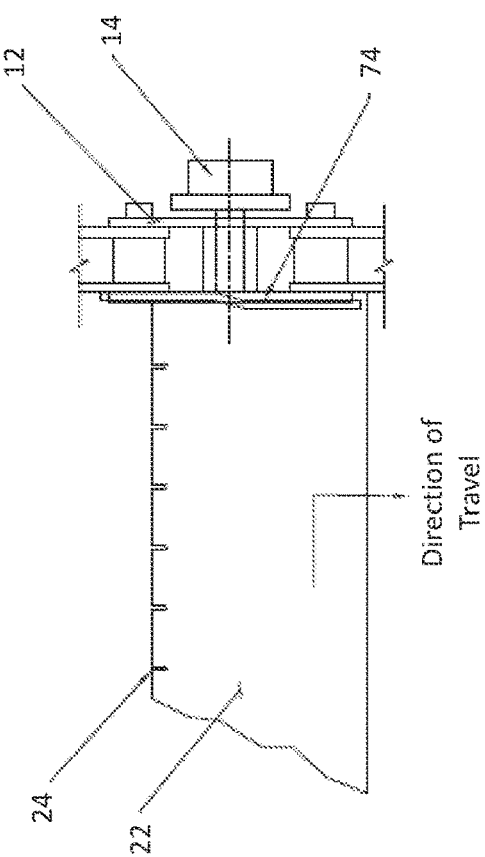
FIG. 8 is a schematic diagram illustrating an example embodiment of a portion of an apron pan particularly illustrating notches therein.

The apron pan 20, engineered for high temperature and water exposure, is similarly adapted to resist the same conditions as the chains 12 and the rollers 14, described above. The apron pan 20 is also adapted to resist the HBI charging loads which can cause erosive wear, impact deflection, and maldistribution. The apron pan 20 include apron pan floors 22 with openings 24 as best seen in FIGS. 8 and 9. FIGS. 8 and 9 are schematic diagrams illustrating example embodiments of a portion of apron pan 20 particularly illustrating openings 24 therein. In FIG. 8, the opening 24 are shown as notches located in the trailing edge. Suitable size may be about ¼ inch×1 inch, however, other suitable sizes may be employed. Similarly, FIG. 9 shows openings 24 as elongated slots. Suitable sizes of these slots may be about ¼ inch×2 inch, however, other suitable sizes may be employed. The apron pan 20 may be considered as an assembly of horizontal carrying floor plate and side retaining walls to accommodate a deeper bed of material. A plurality of apron pans overlap each other according to embodiments. Further illustrated in FIGS. 8 and 9 are chain 12, apron pan or carry roller 14 and sidewall 74.

Thus, the apron pan 20 include openings 24, such as apertures, holes, notches, gaps, slits, and the like that are adapted to allow consistent drainage of water from the apron pan 20. For instance, the trailing edge may overlap the leading edge behind it. A plurality of apron pans 20 may thus overlap each other. Openings 24 may be advantageously cut into pan 20, e.g., on a trailing edge, so that water can drain into the hopper or sluice below.

Such a design is advantageous and solves the problem of water pooling up in the apron pan 20 and overcooling the bottom layer of material. It has also been advantageously and surprisingly determined that employment of openings 24 is beneficial in achieving a desired product in terms of moisture retention. For instance, it is advantageous to maintain a moisture retention in the discharging product/material of less than about 2 wt. %, e.g., between about 1 to 1.5 wt. %, because it has been found that at higher moisture retention levels, the material may start to re-oxidize. Thus, if water is not drained away via, e.g., openings 24, according to embodiments, the moisture retention level can significantly increase in the bottom layer of briquette material.

The tension-balancing take-up system is adapted to maintain equal tension in the chains 12, which maintains alignment of the apron pan conveyor 1 and balances loads on the drive system.

The drive system comprises head and tail sprockets 18 of the chain driven conveyor 1. The sprockets 18 are located on a shaft driven by a geared motor or motor-driven speed reduction system. More particularly, the drive system may include an electric motor driver which is driving a head shaft comprising the two referenced sprockets 18. Sprockets 18 may engage the left and right apron chains 12 as the apron pan 20 and its components thereon are connected. It is further noted that, according to embodiments, the sprockets 18 are designed and sized in order to suitably fit the carriage side flushing hopper (sluice) 3 between the carry and return strands 26, 28, as well as position the carriage side flushing hopper/sluice 3 and return side flushing hopper/sluice 4, further described below.

The carrying rails are adapted to resist the same conditions as the chains 12, described above.

Figure 11:
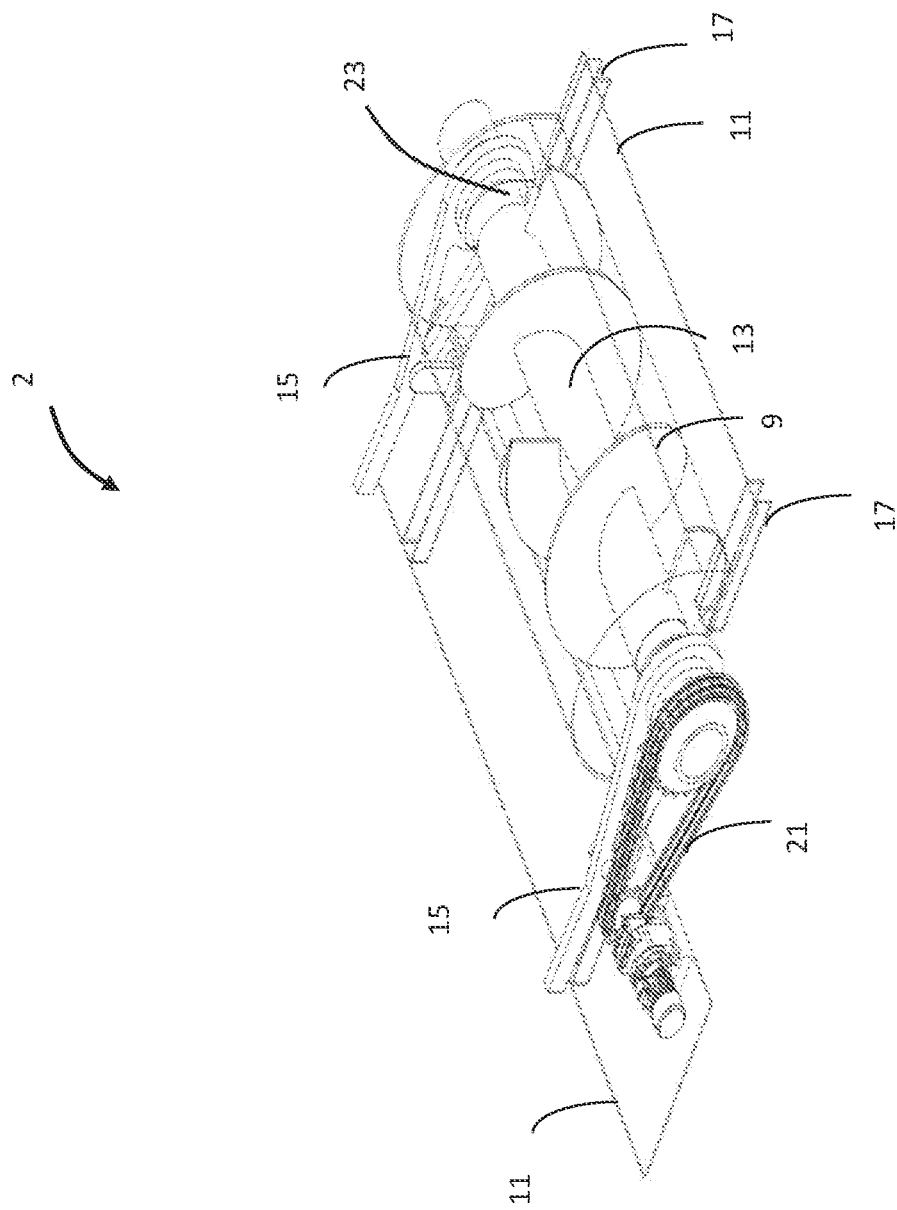
FIG. 11 is a schematic diagram of an example embodiment of a leveling device of the present disclosure particularly illustrating a spiral screw therein.

The optional load leveling device 2, best seen in FIGS. 2 and 11, is adapted to spread and level any unevenly charged briquettes or burden into a more uniform pile across a width of the apron pan 20. In embodiments, the load leveling device 2 includes at least one of a fixed rake and blade adapted to spread the briquettes across the width of the apron pan 20 and into the uniform pile. In some embodiments, the load leveling device 2 also includes at least one of a rotary and oscillatory device that is adapted to spread the briquettes across the apron pan 20. For example, FIG. 11 is a schematic diagram of an example embodiment of load leveling device 2 including a spiral screw 9. As shown in FIG. 11, according to an embodiment, load leveling device 2 includes a spiral screw 9 for evenly spreading the briquettes. The spiral screw 9 may be a bi-directional screw with, e.g., two spirals in opposite directions attached to the shaft 13, as shown in FIG. 11. The load leveling device 2 of FIG. 11 further includes the shaft 13 mounted on two pivoting frames 15 which move up and down. The yoke thereof is vertically mounted and provides the pivot point. Bars 17 are a fixed part of casing 11, and do not move up and down. Slot opening 23 is part of the fixed casing 11, and allows room for the leveler shaft to move up and down. The rounded cover is also fixed, and does not move up or down. As also best seen near drive chain system 21, bars 17 may be interrupted to provide slot opening 23. In operation, the drive chain system 21 drives the shaft 13 and the load leveling device 2 distributes or spreads the hot briquettes 40 deposited from chute 42 of charging chute assembly 7 onto apron pan 20 into a more uniform or even distribution thereon, which promotes a more effective cooling. As the shaft 13 and spiral screw 9 rotate slowly and at a high torque during typical operation, the spirals or spiral blades may churn the top material of the hot briquettes 40 to the side and spread out the material for a more even distribution. The rotation is typically counter-current to the flow of material and at low rotational speeds of about 0.5 rpm to about 3 rpm, including about 2 rpm, as non-limiting examples. Rotation is typically forward and downward advantageously providing a plow-like force on the material. It will further be appreciated that, as in the case of components of system 10, the components of the leveling device 2 may be made of any suitable materials including suitable metal.

As noted above, according to embodiments, in systems and methods of the present disclosure the carriage side flushing hopper (or sluice) 3 is advantageously sandwiched or positioned between the carry and return strands 26, 28 so that fines and water from the cooling process are captured in the carriage side flushing hopper (sluice) 3 without impinging the return strand 28, and avoiding the issues encountered with flushing slurry to an external trench where channel velocity is difficult to maintain and solids settle out as a matter of course, causing significant maintenance problems. Advantageously, capturing and conveying water and fines in a flushing hopper (sluice) rather than, e.g., a tank, maintains wheels and chains non-immersed thereby avoiding problems encountered in prior designs.

Carry strand 26 and return strand 28 are best seen in FIG. 1 illustrating product load on the apron pan conveyor 1 and may considered as, e.g., a conveyor belt or part thereof. For example, the carry strand 26 and the return strand 28 may accordingly refer to the upper and lower part, respectively, of such a conveyor system. Thus, as will be appreciated, the strands 26, 28 are part of the continuous apron pan conveyor 1. Return strand 28 may have the same cross-section of carry strand 26 and be considered an inverted or mirror image thereof. The carry side/carry strand 26 located as a top or upper part carries the product load, and the return side/return strand 28 is the part of the conveyor 1 or belt that travels, turns the tail sprocket and loops back in the continuous loop. Typically, only the top or upper part, carry strand 26, carries the product load.

The carry and return conveyor strands 26, 28 are typically spaced vertically at a sufficient distance to avoid water immersion of components of the HBI slow cooling system 10, by integration of a carriage side flushing hopper or sluice 3 (embodied as a triangular hopper as a non-limiting example) between the strands 26, 28 to collect and flush out water and fines as a slurry.

According to embodiments, the carry strand 26 and the return strand 28 are spread apart or positioned apart employing the afore-referenced larger drive sprocket 18 for the apron pan 20 and locating the carriage side flushing hopper or sluice 3 therebetween.

The carriage side flushing hopper (or sluice) 3 typically includes at least one of a channel flow nozzle 32, side flushing or wash-down spray 34, a hopper bottom, a final water effluent discharge point and a maintenance hatch. Each feature is described in further detail below, according to embodiments.

An embodiment of channel flow nozzle 32 is best seen in FIG. 7. Channel flow nozzle 32 may be part of a pipe or other suitable flow device and the inventors determined that it is desirable to operate in a certain flow regime, as further described below. Channel flow nozzle 32 or pipe nozzle creates an initial channel flow down the center part of carriage side flushing hopper (sluice) 3. According to embodiments, it is noted that three flows may typically enter carriage side flushing hopper (sluice) 3, 1) the referenced channel flow from channel flow nozzle 32 which carries solids to the desired output; 2) side flushing or wash-down sprays 34, best seen in FIG. 4, which keep the sides of carriage side flushing hopper (sluice) 3 wet so that any material that may fall in is desirably flushed down; and 3) residual cooling water entering the carriage side flushing hopper (sluice) 3 from above.

According to embodiments and as best seen in FIG. 1, the carriage side flushing hopper (or sluice) 3 also may include at least one screw classifier 30. Inclusion or integration of screw classifier 30 in carriage side flushing hopper 3 at, e.g., a side thereof may be referred to Option 1 herein for ease of reference. Putting screw classifier 30 in hopper 3 has surprising advantages, and such a design has not been accomplished before to the inventors' knowledge. For instance, the inventors determined that it is advantageous to operate the channel flow of channel nozzle 32 in a certain flow regime, and that screw classifier 30 may reside in its own trough and be integrated into the side of carriage side flushing hopper (sluice) 3. The trough provides a channel velocity slow down point where solids can drop out. According to testing, to adequately deposit solids in screw classifier 30 trough, it is advantageous to regulate water flow in the channel of channel nozzle 32 to a minimum and maximum range to enable a sufficient drop out rate of solids in the screw classifier 30. An example of a suitable range is between about 50 gal/min to about 150 gal/min water flow. It was found that such a range for the channel flow nozzles 32 allows the slurry flow to slow down at the classifier trough to drop out greater than about 50% of the solids, for removal by a classifier screw. At flow rates exceeding about 150 gpm, the solids drop out rate can decrease such that the use of the classifiers is less efficacious.

Thus, according to embodiments, screw classifier 30 residing in its own trough integrated into the side of carriage side flushing hopper (sluice) 3 advantageously provides a channel velocity slow down point where the solids can drop out. To assist in regulating the water flow in the range noted above, some volume of water may be removed at the screw classifier 30 with the use of a launder (not shown in FIG. 1) or overflow point built into a side of the trough. Without such a feature, the channel flow may continue to build up in the hopper due to, e.g., the other flows entering therein potentially increasing the range above the desired maximum water flow of about 150 gal/min.

According to embodiments and as best seen in FIG. 1, the bottom end of screw classifier 30 is advantageously below the main channel of the carriage side flushing hopper (sluice) 3 providing a trough effect such that as the channel flow comes around, it slows down and solids drop out of suspension. Maintaining the water flow through channel flow nozzle 32 in the afore referenced range of about 50 gal/min to about 150 gal/min advantageously allows 50% or greater solids drop out into the screw classifier's trough 30 best seen in FIG. 1. Advantageously, according to embodiments and herein Option 1, the screw classifier 30 operates in a screw-type conveyor fashion, twisting or screwing solids up to the top of the classifier 30 where solids drop out via chute 36 and water may be retained in the hopper 3.

Figure 4:
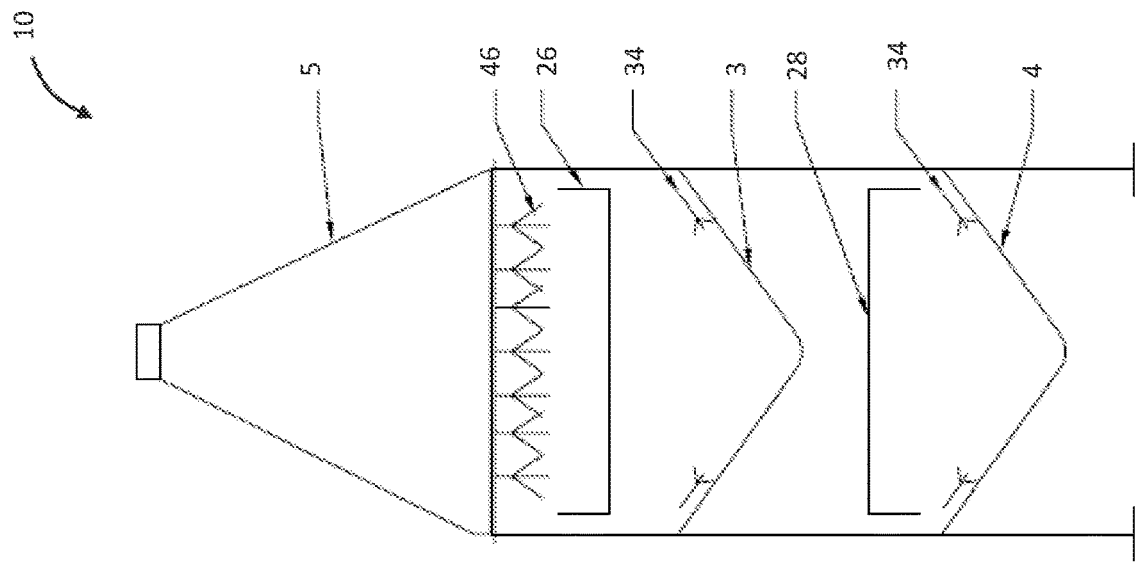
FIG. 4 is a schematic cross-sectional diagram illustrating another example embodiment of an HBI slow cooling system or briquette cooling conveyor system of the present disclosure, particularly illustrating cooling spray nozzles.

The side flushing or wash-down sprays 34 are adapted to wet sides of the carriage side flushing hopper (or sluice) 3, as well as sides of return side flushing hopper (or sluice) and 4 to avoid fines build-up. As shown in the embodiment of FIG. 4, sprays 34 may comprise a series of flat spray nozzles positioned at the upper edge of hopper 3, as well as hopper 4, on each side. The sprays 34 may create a sheet-like flow of water down the sides of the hoppers 3, 4 so that any material, such as solids and/or liquids, that may fall into the hoppers 3, 4 can flow down thereby avoiding accumulation in the hoppers 3, 4. Such material may advantageously be flushed down by the sheet-like flow of water down to the main channel.

The hopper bottom of the carriage side flushing hopper (or sluice) 3, as well as that of hopper 4, is typically arcuate and radiused, but may be a sharp vee or a narrow trapezoidal shape. The hopper bottom may be fitted with one or more longitudinal channel flow (flushing) nozzles to flush solids down the carriage side flushing hopper (sluice) 3.

A plurality of the afore-described screw classifiers 30 may also be spaced at regular intervals, adapted to partially capture the slurry in sumps, de-water the solids and eject them from the carriage side flushing hopper (sluice) 3. According to embodiments, the hopper bottom may thus be adapted to flush the solids down the carriage side flushing hopper (sluice) 3 to classifier sumps. At each screw classifier 30, a water overflow launder noted above may regulate the cumulative channel flow in the carriage side flushing hopper (sluice) 3, as the increasing channel flow may reduce the effectiveness of classifier dewatering.

The maintenance hatches of carriage side flushing hopper (sluice) 3, as well as return side flushing hopper (sluice) 4, are typically regularly spaced and are positioned to allow in-operation access to remove any channel blockages, as well as full access for repair during shutdown conditions.

The final water effluent discharge point may comprise pipes at the end of the carriage side flushing hopper (sluice) 3, as well as return side flushing hopper (sluice) 4 leading to, e.g., a sump or separation system.

According to embodiments, the final water effluent may be captured in a flushing hopper (sluice) 3 discharge conduit and conducted to a blowdown sump for additional solids settling and separation via a drag chain or screw classifier. The blowdown sump is adapted for settling prior to the water being recycled to the flushing system via closely coupled pumps at the sump overflow. To balance the overall system, some of the recycled flow may be diverted to a plant water system as a cooling conveyor system blowdown.

According to further embodiments, the flushing hopper (sluice) 3 is adapted to flush the captured water and fines to a single discharge at a closely coupled classifier sump, for dewatering, solids removal, and recycling the water back to the flushing system and blowdown to plant water system. Here, the channel flow is developed to take advantage of the full cumulative flow increase to entrain and convey all of the captured solids to the classifier for settling and removal. The classifier, which may be a spiral screw type with integrated sump and overflow launders, discharges separated solids to a fines conveyor, for conveyance to a common bunker or other receptacle. Overflow water from the classifier launders then discharges to a deeper part of the sump where pumps may recycle the water back to the flushing system.

As noted above, according to embodiments, the carriage side flushing hopper 3 is advantageously sandwiched between the carry and return strands 26, 28 so that fines and water from the cooling process can be captured in the carriage side flushing hopper 3 without impinging the return strand 26, and avoiding the issues encountered with flushing slurry to an external trench where channel velocity is difficult to maintain and solids settle out as a matter of course, causing significant maintenance problem. In such embodiments, the recycled water flow from the settling sump may be balanced with the incoming cooling water from the cooling zones (as captured in the flushing hoppers 3). This balance may be achieved by diverting some of the recycle flow as a blowdown to a plant process water treatment system for additional treatment. This blowdown fraction is approximately equivalent to the cooling flow supplied to the cooling zones from the plant process water supply. In this regard it is noted the same balancing principle applies to the former embodiment. A difference, according to embodiments, includes that water from overflow launders at each side classifier may be conducted to the end sump for recycling as described here.

The vapor removal hood 5 is coupled down the carriage side flushing hopper (sluice) 3 to the apron pan conveyor 1. The vapor removal hood 5 typically includes bottom edges, a duct, wash-down sprays, and a measurement and balancing system.

The bottom edges are typically fitted in a labyrinth arrangement with the apron pan side walls. The labyrinth arrangement of the bottom edges with the apron pan side walls limits egress of solids, water, and vapor from the cooling zones.

The duct is adapted to entrain a vapor and fines into a ducted flow, which is directed to the vapor scrubber system 8.

The wash-down sprays are adapted to periodically wet the vapor removal hood 5 and surfaces of the duct surfaces, which can minimize buildup of fines thereon.

The flow measurement and balancing system is adapted to detect upset flow conditions, such as when larger fragments or solids buildup enter and lodge in the flow channel, creating a blockage. The flow measurement and balancing system is adapted to provide indication of such a condition to the operator for maintenance, such as an alert, an alarm, and the like.

As best seen in FIG. 1, the vapor scrubber system 8 is adapted to quench the vapor stream, condense the vapor to liquid water, and drop fines out in the effluent. The vapor scrubber system 8 typically includes a slurry effluent, a sump, an induced draft fan, an emissions monitor, and a dedicated settling sump.

The slurry effluent is adapted to blowdown to a sump for further separation of water and solids.

The induced draft fan is adapted to conduct the remaining gaseous effluent therethrough to a dust collection system or to a discharge stack.

The emissions monitor is adapted to monitor the gaseous effluent discharged by the vapor scrubber system 8 for regulated emissions levels. The blowdown slurry is typically pumped to the dedicated settling sump. After settling, the water effluent may be pumped to a plant water treatment where any residual solids are removed from the water. By removing fines and other particulates out of the effluent, the vapor scrubber system 8 limits the particulate emissions of the HBI slow cooling system 10.

Advantageously, the vapor scrubber system 8 is adapted to discharge gas and slurry flows well below 100° C. and typically in the 50° C. to 75° C. range.

The return side flushing hopper (sluice) 4 is a secondary capture hopper positioned under the return strand 28. The return side flushing hopper (sluice) 4 may be described as above for the carriage side flushing hopper (sluice) 3. However, it is noted that according to embodiments wherein small classifiers 30 are located on the side of carriage side flushing hopper (sluice) 3, such classifiers would typically not be employed on the return side flushing hopper (sluice) 3 in view of the lower amounts of solids expected to be captured therein. For example, the return side flushing hopper (sluice) 4 is typically intended to be employed to capture any material (solids/liquids) that is carried over by the conveyor 1 as it makes it return path.

The return side flushing hopper (sluice) 4 typically includes one or more of a hopper channel, flushing nozzle, and maintenance hatch.

The hopper channel is adapted to contain residual fines and water from the conveyor return strand 28 and keep them segregated from the upper, carry strand 26. The hopper channel is also adapted to capture and flush the residuals from the system 10, and in particular, the conveyor return strand 28 in the same or a similar manner as the carriage side flushing hopper (sluice) 3. By so doing, immersion of the return strand 28 can be avoided as well as deposition of fines and water into an external sump.

According to embodiments and herein Option 1, the hopper channel is adapted to flush the residuals to screw classifier 30. In embodiments, the screw classifier 30 is positioned near a tail end of the apron pan conveyor 1. In some embodiments, the return side flushing hopper 4 only includes a single screw classifier 30. According to embodiments, the return hopper 4 may sluice to the same pump as noted above with a single solids dewatering mechanism such as, e.g., a single classifier or a drag chain. Other solids separation techniques may also be employed including, but not limited to, using a hydrocyclone or an inclined plate separator.

The maintenance hatches are typically regularly spaced and are positioned to allow in-operation access to remove any channel blockages as well as full access for repair during shutdown conditions.

The charging chute assembly 7 typically includes a chute 42, a spreader, and charging points. The chute 42 is adapted to minimize drop height onto the apron pan 20 and includes an angled egress that is adapted to promote a sliding deposition of the briquettes onto the apron pan 20.

The optional spreader (leveling device 2), such as a fixed rake or a blade, is adapted to ensure even distribution over the apron pan 20 at an egress of the chute 42. In embodiments, the charging chute assembly 7 is adapted to minimize a number of charging points based on layout needs of the particular HBI plant.

Regarding cooling system 6, experience and testing shows that the most uniform cooling of HBI can be achieved with a well-distributed single layer of briquettes impinged with a field of fine sprays, carefully controlled to minimize water absorption. However, in practice, it is difficult if not impossible to achieve such a distribution, due to the random generation of briquette "packs", or aggregations of briquettes in counts of two (twins/doubles), four (quads), or six (sixpack.) These aggregations may negatively impact the spray cooling approach, leading to performance degradation. Thus, a practical design should accommodate multiple layers of briquettes. Some systems have employed cascades of water overflowing from weir boxes to cool the two-four layer deep bed of HBI. While these weirs may be effective for cooling, they were susceptible to plugging and failure by fines accumulation.

It has been herein determined that a coarse water droplet size is able to penetrate the bed to cool multiple layers simultaneously, as opposed to the "top down" cooling effected by fine sprays. Thus, accordingly, embodiments of the invention, supported by research into effective nozzle types, advantageously utilize coarse spray nozzles 46, e.g., mounted in headers to cover the bed of HBI as it traverses the length of the cooling zones 44 of cooling system 6. Further, these nozzles 46 are adapted for "dirty water" or relatively high TSS (total suspended solids) water so that spray nozzle plugging is also mitigated. These nozzles 46 are preferentially selected based on testing to provide, e.g., a "full-cone" spray pattern with large (~0.8 to 2 mm diameter, Dp50 basis) droplets to better penetrate the bed of HBI. Such nozzles 46 were tested against finer spray nozzles to make this selection.

Thus, the cooling system 6, as best seen in FIGS. 1, 2, 5 and 6, typically includes manifolds, nozzles 46, temperature measurement devices, and a supplemental deluging nozzle system. According to embodiments, the apron pan conveyor 1 is sub-divided into cooling zones 44 and a manifold is positioned above each cooling zone 44. A nozzle 46 may be mounted to each manifold above a cooling zone 44 and oriented to provide optimized cooling to briquettes in the corresponding cooling zone 44. The nozzles 46 are adapted to minimize bearding due to fines-buildup therein and are adapted to operate with typical plant process water that is recycled and contains known levels of impurities therein.

The nozzles 46 are typically positioned at a height above the apron pan conveyor 1 that is easily accessible, such as without use of further equipment, to facilitate fast nozzle change and cleaning.

The temperature measurement device may include a shroud thereabout and is typically adapted to assess temperatures of the briquettes in each cooling zone 44. According to embodiments, temperature may be measured entering the first cooling zone and possibly again at an intermediate position such as, e.g., intermediate temperature measurement zone 72 of FIG. 6, and then at the discharge zone prior to exiting the conveyor. The foregoing advantageously allows space for any applied water to dry from the surface prior to a non-contact zone.

A supplemental deluging nozzle system is adapted to rapidly quench the briquettes, in an over-temperature event or other upset case. In particular, the supplemental deluging nozzle system is adapted to quench the briquettes in upset operational cases, such as hot remelt/oxide handling, severe upstream process problems, or other conditions where there exists the need to rapidly quench the conveyed material. The nozzles of the supplemental deluging nozzle system are typically shrouded (by inert gas flow) and are adapted to remain dry during general operation of the system 10 until the need to use them arises, such as during an upset condition. The supplemental deluging nozzle system includes a quick-operation deluge valve that is adapted to open and permit a sufficient flow of water to flood the supplemental deluging nozzle system.

Figure 5:
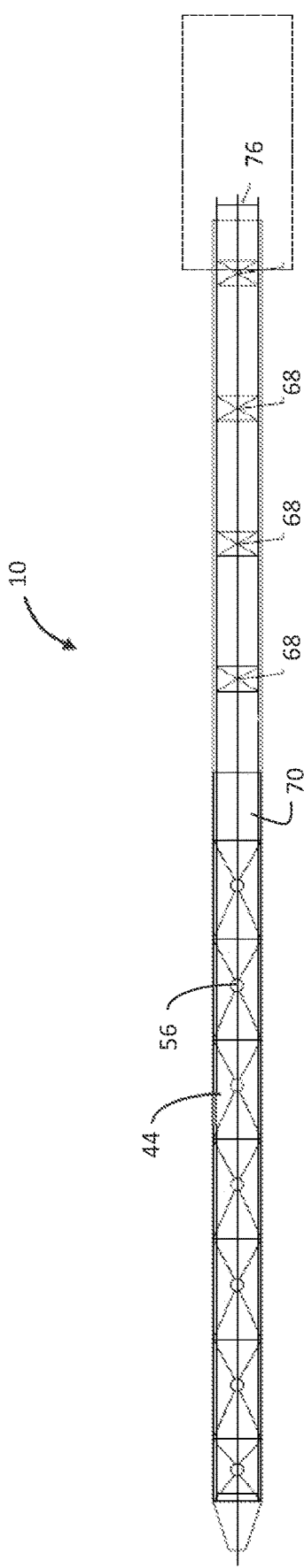
FIG. 5 is a schematic diagram illustrating a top view of an example embodiment of an HBI slow cooling system of the present disclosure, particularly illustrating cooling zone and charging points.

In operation, according to embodiments and with particular reference to FIG. 2, hot briquettes 40 enter and flow down chute 42 of charging chute assembly 7. There, the hot briquettes 40 typically come to rest on a bed or other surface on the apron pan 20 of apron pan conveyor 1 operating in a continuous, oblong loop fashion. If needed, load leveling device 2 spreads out the material to obtain a more uniform distribution. The bed of material then moves continually into cooling zones 44 of cooling system 6. Cooling zones 44 are also depicted in FIG. 6 as including trapezoidal shaped hoods. The trapezoidal hood shape advantageously provides the desired coverage so as to provide a consistent negative pressure across the cooling zones 44 and a low enough gas velocity to allow larger particles and free water to drop out back to the conveyor 1 instead of being drawn into the vapor removal ducting. However, it will be appreciated that other suitable designs could be employed. As shown in FIGS. 2, 5 and 6, according to embodiments, the cooling section is divided in six cooling zones 44. However, more or less zones could apply depending upon desired sizing of the system, etc. Typically, in each cooling zone 44 there are pipe headers with the afore-described cooling spray nozzles 46. Advantageously, the flow rate from those nozzles 46 may be varied, but typically each is operating at a set flow for a given production rate.

As noted above, embodiments advantageously utilize spray nozzles 46, which can be mounted in headers to cover the bed of HBI as it traverses the length of the cooling zones 44 of cooling system 6. Further, these nozzles 46 are adapted for "dirty water" or relatively high TSS (total suspended solids) water so that spray nozzle plugging is also mitigated. These nozzles 46 are preferentially selected based on testing to provide, e.g., a "full-cone" spray pattern with large (~0.8 to 2 mm diameter, Dp50 basis) droplets to better penetrate the bed of HBI. Such nozzles 46 were tested against finer spray nozzles to make this selection. Nozzles 46 may comprise an overlapping triangular format as depicted, e.g., in FIG. 1, oblong spray design as shown in FIG. 4, or in header design as shown in FIG. 5 among other suitable designs. As an example, and with reference to FIG. 5, each pipe may have a series of nozzles pointing downward to conveyor 1. Again, it has been determined that selecting the nozzle 46 to provide coarse droplet size, such as the coarse droplet size noted above, is advantageous and can provide a cascading waterfall effect on the bed of hot briquettes 40, which may be in multiple layers, moving on conveyor 1. This coarse spray effect as opposed to fine spray misting, achieved by using coarse spray nozzles 46, such as full cone spray nozzles providing the afore-referenced coarse droplet size as a non-limiting example, effectively cools the layers of material by penetrating deep into the bed. Such features also replaces and solves prior problems with weir troughs filling up with fine material and then plugging so that little water flow occurs.

As the bed of briquettes moves through the cooling zones 44 and cools, it accordingly gives off steam or vapor, which may be removed by vapor removal hood 5 via a ducting arrangement 48 entering vapor scrubber system 8, best seen in FIG. 1. This "dirty" steam or vapor comprising water and some fine material may enter vapor scrubber system 8 where the hot vapor is cooled down, water condenses out and "dirty" material removed with a scrubber. The bed of cooled material then travels to the head end of the conveyor 1 where the cooled briquettes may be discharged to, e.g., another conveyor for storage, shipping, etc. In this regard it is noted that embodiments may thus advantageously cool the HBI from briquetting temperatures of about 650-700° C. to 400° C. in approximately 2 minutes, and not less than about 1.5 minutes, after which the temperature of the material may be dropped further about greater than 85° C. and less than about 130° C. at discharge.

As further described below any material migrating through the apron pan 20 via openings or slots 24 is advantageously allowed to drain to collection in the carriage side flushing hopper (sluice) 3. Thus, under the carry side of conveyor 1, carriage side flushing hopper (sluice) 3 is located therein and any cooling water not vaporized may filter down through the bed of material and the apron pan 20 and advantageously fall into the carriage side flushing hopper (sluice) 3 carrying fines and so forth along with it. As described above, the carriage side flushing hopper (sluice) 3 is equipped with side flushing or wash-down sprays 34, and channel flow nozzles to capture and convey such water and fine material to the tail end of conveyor 1 where such material may be discharged to, e.g., a separator sump or screw classifiers 30 of carriage side flushing hopper (sluice) 3 where solids could be separated as described above.

Located below the foregoing is the return strand 28 (return side of conveyor 1). As the conveyor 1 travels back to the tail end, residual fines and other residual solids may have dropped down during the process and are captured in return side flushing hopper (sluice) 4 where this material is intended to be flushed down to the end to, e.g., a sump 48.

It is further noted that as the conveyor 1 moves around on the return side, a cleaning device 50, such as sprays or rotating brushes for instance, may be employed to clean the return side (return strand 28 of conveyor 1) off as it moves around the sprocket 18 at the head end. An advantage of such sprays or rotating brushes is that it allows any material to be initially dislodged at an earlier stage and drop into, e.g., the carriage side flushing hopper (sluice) 3.

With further regard to operation and particular reference to FIGS. 1 and 2, as the conveyor 1 moves through cooling zones 44, flow rate of cooling nozzles 46 may be regulated to match the cooling rate desired for a particular production rate of material. Again, according to embodiments, the nozzle type of cooling nozzles 46 is advantageously selected to provide the afore-referenced coarse droplet size to avoid overcooling the top layer of briquettes and undercooling the bottom layer, thereby achieving a balanced cooling effect.

Figure 3:
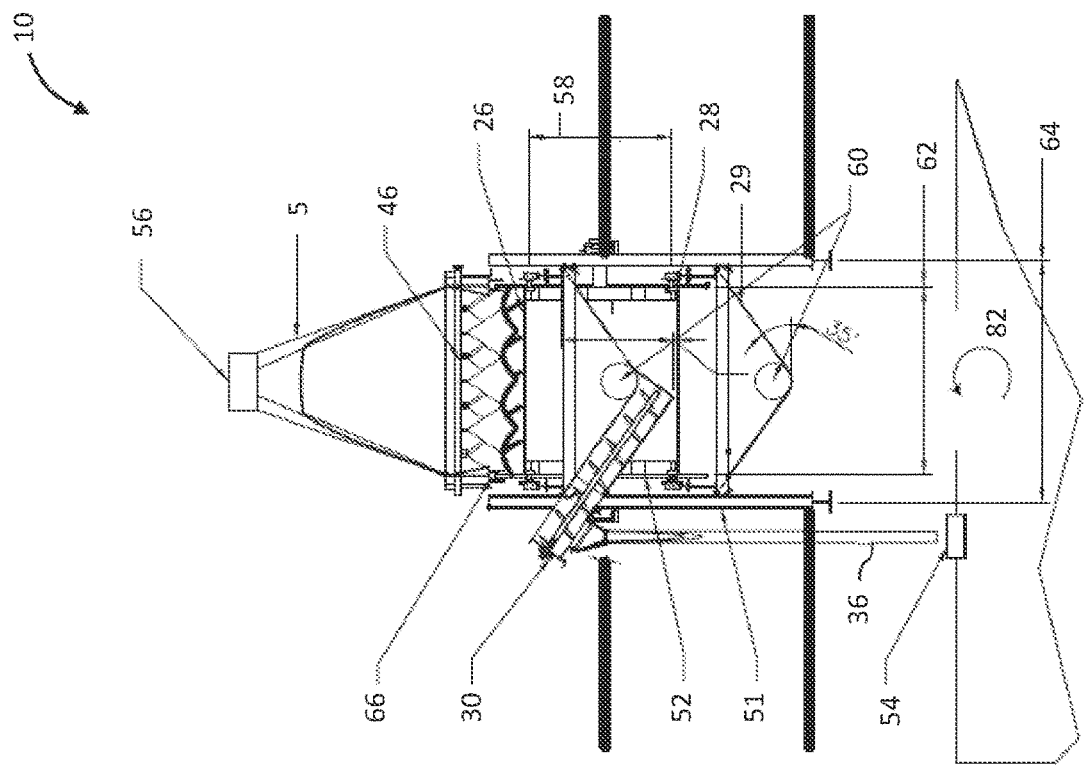
FIG. 3 is a schematic cross-sectional diagram illustrating another example embodiment of an HBI slow cooling system of the present disclosure.

Referring now to FIG. 3, FIG. 3 is a schematic diagram illustrating another example embodiment of an HBI slow cooling system 10 of the present disclosure, which is a further modification of FIG. 1 and is mirrored from that of FIG. 1. Thus, FIG. 3 may be described similarly as in the case of FIG. 1. However, in FIG. 3, and overflow launder 52 or weir is present below, e.g., each classifier 30. The launder 52 advantageously acts as a cleaning mechanism allowing cleaner water overflowing and "dirty" water remaining behind. As noted above, it has been determined that it is advantageous to regulate the water flow in the channel of channel nozzle 32 to a minimum and maximum range to enable a sufficient drop out rate of solids in the screw classifier 30. An example of a suitable range is between about 50 gal/min to about 150 gal/min water flow. It was found that such a range for the channel flow nozzles 32 allows a solids drop out of more than 50% solids retention at the screw classifier trough. With use of launder 52, an amount of water may be removed from each classifier 30 and assist in maintaining the desired flow rate.

FIG. 3 further illustrates a fine solids transport 54, which may include a conveyor that takes away solids that drop down chute 36, and a support structure 51. FIG. 3 further illustrates an angle of about 35 degrees (approximate minimum angle from horizontal) for the walls 29 of both the carriage side flushing hopper (sluice) 3 and return side flushing hopper (sluice) 4. It has advantageously been found that 35 degrees or more would be sufficient.

With further reference to FIG. 3, the HBI slow cooling system 10 further includes vapor offtake 56 above aforedescribed vapor removal hood 5. Cooling zone nozzles 46 are illustrated therein as a spray nozzle manifold with full-cone, coarse spray nozzles, also described above. Apron pan 20 load side (carry strand 26) and apron pan 20 return side (return strand 28) is further illustrated with pitch diameter 58 therebetween, which varies with hopper (sluice) 3 depth. Carriage side flushing hopper (sluice) 3 and return side flushing hopper (sluice) 4 discharge pipes 60 are further shown, which flow down to sump (not illustrate in FIG. 3). The width to mount the outboard wheels and the frame width, 62, 64, respectfully is further shown therein.

It is further noted that the vapor removal hood 5 is designed, according to embodiments, to mesh with the side walls of the apron pan conveyor 20. There may be an upturn to reach a sidewall that may overlap the one behind it, and at the bottom of the vapor removal hood 5 is a labyrinth hood to sidewall seal 66 also shown in FIG. 3 to maintain as much vapor and solids inside as possible.

Referring now to FIG. 4, in this embodiment of the HBI slow cooling system or briquette cooling system 10, cooling spray nozzles 46 are illustrated above the apron pan 20 load side (carry strand 26). In this embodiment, classifiers 30 may not be incorporated into the carriage side flushing hopper (sluice) 3, nor water flow regulated in the aforereferenced about 50 gal/min to 150 gal/min range. Instead, the channel flow of channel nozzle 32 is present sufficient to discharge the fines and other material to, e.g., a sump. This channel flow is boosted by the advantageous side flushing or wash-down sprays 34.

FIG. 5 is a schematic diagram illustrating a top view of an example embodiment of an HBI slow cooling system 10 of the present disclosure, particularly illustrating cooling zones 44 and charging points 68; and FIG. 6 is a schematic diagram illustrating a side view of FIG. 5. FIGS. 5 and 6 may be similarly described as in the case of FIG. 2. Additionally, in FIG. 6 four charging points 68 and chutes 42 for entering briquettes are illustrated at the tail end of conveyor 1. However, it will be noted that the number of charging points 68 may vary based on design, especially for larger plants potentially requiring more charging points 68. FIGS. 5 and 6 further illustrate temperature measurement zone 70 which assists in obtaining an initial measurement before entry into the cooling zones 44 and at the discharge of the cooling zones, as this was found to be more accurate than obtaining a temperature measurement from within the cooling zones 44. According to further embodiment, an intermediate temperature measurement zone 72 may be present between, e.g., any two cooling zones 44 in a dry section thereof for further accuracy. As further shown in FIGS. 5 and 6, a pumping system such as a blowdown or slurry separator and pump sump 76 may be located in close proximity to the conveyor 1 to minimize the distance to flow such slurry from the hoppers (sluices) 3, 4. In this regard and as also shown in FIG. 3, hopper (sluice) 3, 4 discharge pipes 60 are pipes at the ends of hopper (sluice) 3, 4 that can flow down to slurry separation and pump sump 76 and a plurality of those pipes may then be connected with a large clarification system to receive the slurry (e.g., fines and water) where the solids are separated out of the flow and the overflow water may be transported to the pump sump section.

FIG. 7 is a schematic diagram illustrating a partial side view of an example embodiment of the HBI slow cooling system 10 of the present disclosure, particularly illustrating the afore-described advantageous channel flow nozzles 32. Thus, according to embodiments, and which may be referred herein as Option 2, instead of using a classifier 30 at the side of, e.g., the carriage side flushing hopper (sluice) 3 as shown in FIG. 1, the flow pattern is controlled such that the material (e.g., solids such as fines, and liquids) are flushed or sluiced to the tail end of the conveyor 1 and into, e.g., a slurry separation and pump sump 76, as shown in FIG. 6. This design is particularly advantageous in the handling of larger quantities of fines on an intermittent basis, and is especially useful for larger plants. Thus, in this embodiment, the carriage side flushing hopper (sluice) 3 is still sandwiched between the return and carry strands 26, 28, however the screw classifier 30 may not be employed.

FIGS. 8 and 9 are schematic diagrams illustrating example embodiments of a portion of an apron pan 20 particularly illustrating openings 24 therein. In FIG. 8, the opening 24 are shown as notches located in the trailing edge. Suitable size may be about ¼ inch×1 inch, however, other suitable sizes may be employed. Similarly, FIG. 9 shows openings 24 as elongated slots. Suitable sizes of these slots may be about ¼ inch×2 inch, however other suitable sizes may be employed. Further illustrated in FIGS. 8 and 9 are chain 12, apron pan or carry roller 14 and sidewall 74.

Figure 10:
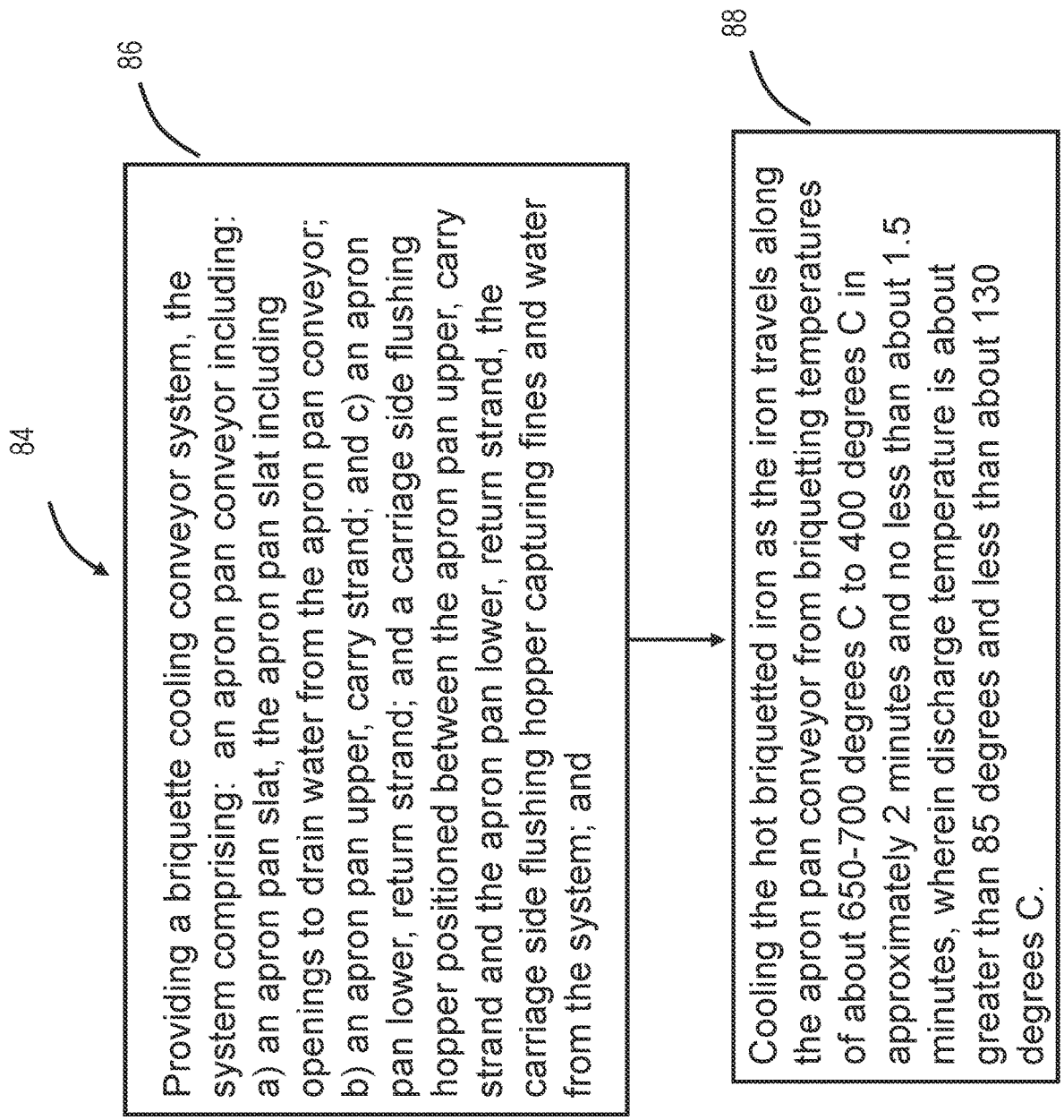
FIG. 10 is a schematic flow diagram of an example embodiment of a method of slow cooling of the present disclosure.

FIG. 10 is a schematic flow diagram of an example embodiment of a method of slow cooling of the present disclosure. According to an embodiment, method 84 comprises at 86 providing a briquette cooling conveyor system, the system comprising: an apron pan conveyor including: a) an apron pan or apron pan slat including openings to drain water from the apron pan conveyor; b) an apron pan upper, carry strand; and c) an apron pan lower, return strand; and a carriage side flushing hopper positioned between the apron pan upper, carry strand and the apron pan lower, return strand, the carriage side flushing hopper capturing fines and water from the system; and cooling the hot briquetted iron as the iron travels along the apron pan conveyor from briquetting temperatures of about 650-700° C. to 400° C. in approximately 2 minutes, and no less than about 1.5 minutes, wherein discharge temperature is about greater than 85° C. and less than about 130° C.

Thus, advantages of embodiment of the invention include the use of apron pan openings 24 of the apron pan 20 of conveyor 1 allowing sufficient drainage into the hoppers (sluices) 3, 4, as described above, and wherein the apron pan 20 and the components of conveyor 1 are non-immersed in water. In an attempt to achieve the desired slow cooling, prior systems employed an apron pan fully immersed in a water tank for, e.g., at least half of the conveyor rotating length, which can cause mechanical failures, wear and deterioration. In some prior systems, solids such as fines would fall to the bottom of the water tank equipped with a drag chain which would drag the material out to, e.g., a take away conveyor. According to embodiments, such a water tank and operation is advantageously replaced with use of the afore-described hoppers (sluices) 3, 4.

Further advantages of embodiments include the ability to maintain chains 12 and rollers 14 non-immersed; and proper and improved handling of water and fine material. The foregoing may advantageously be achieved with, e.g., the positioning of the carriage side flushing hopper (sluice) 3 between the carry and return strands 26, 28 of the apron pan conveyor 1.

Still further advantages of embodiments include the selection of cooling nozzle 46 to provide coarse droplet size. This coarse spray effect as opposed to fine spray misting, achieved by using coarse spray nozzles 46 effectively cools the layers of briquettes by penetrating deep into the bed. Such features also replaces and solves prior problems with troughs filling up with fine material and then plugging up with material.

Additional advantages include the use of classifier 30 integrated into the side of hopper (sluice) 3 as in FIG. 1; employment of side flushing or wash-down sprays 34 in hoppers (sluices) 3, 4; and advantageous channel flows, all of which help provide improved processing of system 10, according to embodiments and as described above.

Still further advantages and features of various embodiments of the invention include: the carriage side flushing hopper (sluice) 3 including weirs arranged in series and including screw classifiers 30, wherein each classifier 30 may comprise a water overflow launder to regulate cumulative hopper channel flow with known operating parameters; hopper 3 discharging to a closely-coupled classifier which discharges water to a sump pump, and a pumping system recirculates water to wash-down sprays, with a portion for blowdown for plant process water treatment; the carriage side flushing hopper 3 and the return side flushing hopper 4 are configured to discharge flow to a closely coupled classifier 78 and the classifier 78 is configured to discharge water to a pump sump 80; system configured to recirculate water to the wash-down sprays and to water treatment (shown at 82); the blowdown flow being balanced to the cooling spray flow in the cooling zone; conveyor 1 being inclined on a single level to allow the sluice flow back to the classification system; HBI charge chutes situation at lengths and locations to match the incline; cooling section fitted with one or more non-spray zones to facilitate non-contact temperature monitoring with wide field-of-view sensing equipment; a control system configured to monitor incoming HBI mass flow and temperature, and regulate conveyor speed and cooling flow to achieve desired cooling target at discharge point; where the cooling target is greater than about 85° C. and less than 130° C. at discharge to retain sufficient energy in the HBI to reduce retained moisture levels to less than about 1.5% by weight. According to further advantageous and non-limiting embodiments, an apron pan conveyor includes: a) a plurality of apron pans, the apron pans including openings adapted to drain water from the apron pan; b) a pair of conveyor chain that connect the apron pans on both sides together into a continuous strand to form the carriage side or strand which carry the product out of the conveyor and the return side or strand after the product is discharged from the conveyor and the chain exit the drive sprockets; c) rollers that support the apron as it moves to convey the product: d) support rails where the rollers run; e) a pair drive sprockets on the head shaft provide traction to the chain to move the product; and f) a pair of tail sprockets on the tail shaft to channel the apron pans back to catch the product discharged into the conveyor.

Although the present disclosure is illustrated and described with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are contemplated thereby. Additionally, all features and elements described herein may be used in any combination with each other.

What is claimed is:

1. A briquette cooling conveyor system, comprising:
an apron pan conveyor including: a) a plurality of apron pans including openings adapted to drain water from the apron pan conveyor; b) an apron pan upper, carry strand; and c) an apron pan lower, return strand; and a carriage side flushing hopper positioned between the apron pan upper, carry strand and the apron pan lower, return strand, the carriage side flushing hopper configured to capture fines and water from the system.

2. The briquette cooling conveyor system of claim 1, wherein the system is configured to slow cool hot briquettes from briquetting temperatures of about 650-700° C. to 400° C. in approximately 2 minutes, and no less than about 1.5 minutes.

3. The briquette cooling conveyor system of claim 1, comprising a return side flushing hopper position under the return strand, and wherein the carriage side flushing hopper includes:
wash-down sprays adapted to wet sides of the carriage side flushing hopper, and a channel flow nozzle configured to produce a channel flow of water to flush solids to a desired output, wherein the flow is between about 50 gal/min to about 150 gal/min.

4. The briquette cooling conveyor system of claim 1, wherein the carriage side flushing hopper includes at least one screw classifier, and each screw classifier comprises a water overflow launder.

5. The briquette cooling conveyor system of claim 3, wherein the carriage side flushing hopper comprises a hopper bottom that is one of arcuate, vee-shaped and trapezoidal.

6. The briquette cooling conveyor system of claim 1, comprising a cooling system, wherein the cooling system includes a plurality coarse spray nozzles configured to spray water onto briquettes in coarse water droplet size of about 0.8 to about 2 mm in diameter.

7. The briquette cooling system of claim 3, wherein the carriage side flushing hopper and the return side flushing hopper are configured to discharge flow to a closely coupled classifier and the classifier is configured to discharge water to a pump sump.

8. The briquette cooling system of claim 3, wherein the system is configured to recirculate water to the wash-down sprays and to water treatment.

9. The briquette cooling conveyor system of claim 1, wherein the conveyor is inclined on a single level and the system comprises a hot briquette iron charge chute coupled to the conveyor, and a load leveling device on the conveyor configured to evenly spread the iron, the load leveling device including a spiral screw.

10. The briquette cooling conveyor system of claim 1, wherein the return strand is fitted with cleaning spray nozzles to wash any residual material on the apron pan into the return side flushing hopper.

11. A method of cooling hot briquetted iron comprising:
providing a briquette cooling conveyor system, the system comprising:
an apron pan conveyor including: a) a plurality of apron pans including openings to drain water from the apron pan conveyor; and b) an apron pan upper, carry strand; and c) an apron pan lower, return strand; and
a carriage side flushing hopper positioned between the apron pan upper, carry strand and the apron pan lower, return strand, the carriage side flushing hopper capturing fines and water from the system; and
cooling the hot briquetted iron as the iron travels along the apron pan conveyor from briquetting temperatures of about 650-700° C. to 400° C. in approximately 2 minutes, and no less than about 1.5 minutes, wherein discharge temperature is about greater than 85° C. and less than about 130° C.

12. The method of claim 11, wherein the briquette cooling conveyor system comprises a return side flushing hopper position under the return strand, and wherein the carriage side flushing hopper includes:
wash-down sprays to wet sides of the carriage side flushing hopper, and a channel flow nozzle to produce a channel flow of water to flush solids to a desired output, wherein the flow is between about 50 gal/min to about 150 gal/min.

13. The method of claim 11, wherein the carriage side flushing hopper includes at least one screw classifier, and each screw classifier comprises a water overflow launder.

14. The method of claim 12, wherein the carriage side flushing hopper comprises a hopper bottom that is one of arcuate, vee-shaped and trapezoidal.

15. The method of claim 11, wherein the briquette cooling conveyor system comprises a cooling system, the cooling system including a plurality coarse spray nozzles to spray water onto briquettes in coarse water droplet size of about 0.8 to about 2 mm in diameter.

16. The method of claim 12, wherein the carriage side flushing hopper and the return side flushing hopper discharge flow to a closely coupled classifier and the classifier discharges water to a pump sump.

17. The method of claim 12, wherein the briquette cooling system recirculates water to the wash-down sprays and to water treatment.

18. The method of claim 11, wherein the conveyor is inclined on a single level and the system comprises a hot briquette iron charge chute coupled to the conveyor, and a load leveling device on the conveyor configured to evenly spread the iron, the load leveling device including a spiral screw.

19. The method of claim 11, wherein the return strand is fitted with cleaning spray nozzles to wash any residual material on the apron pan into the return side flushing hopper.

20. The method of claim 11, wherein after cooling the discharged iron has a retained moisture level of less than about 1.5% by weight.

* * * * *